(12) United States Patent
Donovan et al.

(10) Patent No.: US 8,191,277 B2
(45) Date of Patent: Jun. 5, 2012

(54) TAPE MEASURE ANCHORING ACCESSORY

(75) Inventors: Robert S. Donovan, Auburn, AL (US); Tsailu Liu, Auburn, AL (US); Paul W. Holley, Auburn, AL (US); James S. Williams, Auburn, AL (US)

(73) Assignee: Auburn University, Auburn, AL (US)

( * ) Notice: Subject to any disclaimer, the term of this patent is extended or adjusted under 35 U.S.C. 154(b) by 0 days.

(21) Appl. No.: 12/959,530

(22) Filed: Dec. 3, 2010

(65) Prior Publication Data

US 2011/0179662 A1 Jul. 28, 2011

Related U.S. Application Data

(60) Provisional application No. 61/266,408, filed on Dec. 3, 2009.

(51) Int. Cl.
*G01B 3/10* (2006.01)
(52) U.S. Cl. ............................................. 33/758; 33/768
(58) Field of Classification Search .................... 33/758, 33/768, 770, 755
See application file for complete search history.

(56) References Cited

U.S. PATENT DOCUMENTS

| 6,082,014 | A * | 7/2000 | Beyers | 33/414 |
| 6,223,443 | B1 * | 5/2001 | Jacobs | 33/27.03 |
| 6,367,787 | B1 * | 4/2002 | Poole et al. | 269/6 |
| 6,427,358 | B1 * | 8/2002 | LeBon et al. | 33/758 |
| 6,966,123 | B1 * | 11/2005 | Rubino | 33/770 |
| 7,676,941 | B2 * | 3/2010 | Cruz et al. | 33/414 |
| 7,913,409 | B2 * | 3/2011 | Wilson | 33/414 |
| 2002/0026723 | A1 * | 3/2002 | Savalla | 33/414 |
| 2003/0167651 | A1 * | 9/2003 | Pedersen | 33/758 |
| 2011/0179662 | A1 * | 7/2011 | Donovan et al. | 33/758 |

* cited by examiner

*Primary Examiner* — Yaritza Guadalupe-McCall
(74) *Attorney, Agent, or Firm* — Gardner Groff Greenwald & Villanueva, PC

(57) ABSTRACT

The present invention relates to a measuring tool having a substantially puck-shaped body having a top surface and a bottom surface. The tool also includes an elongated slot formed in the top surface and a fastener adjacent the bottom surface. The elongated slot is adapted to receive a portion of a tape measure. The fastener is operable to secure the measuring tool to the underlying work piece. Optionally, the fastener is a magnet.

10 Claims, 6 Drawing Sheets

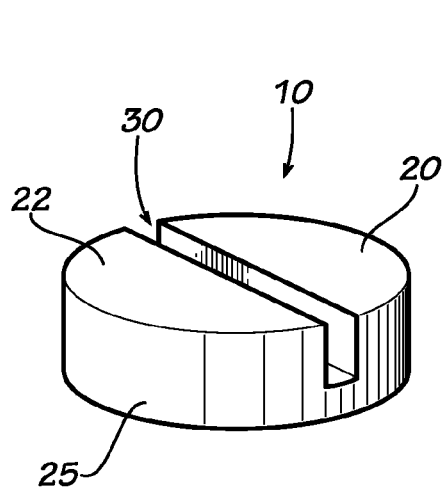
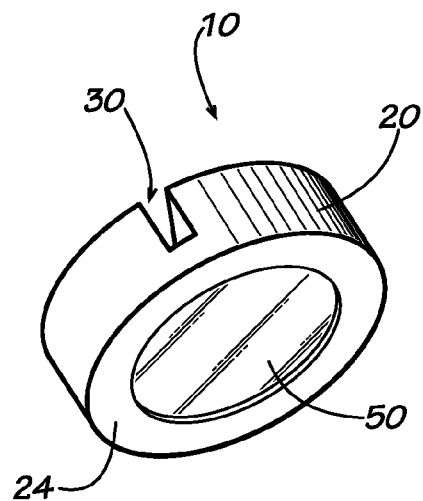
FIG. 1  FIG. 2
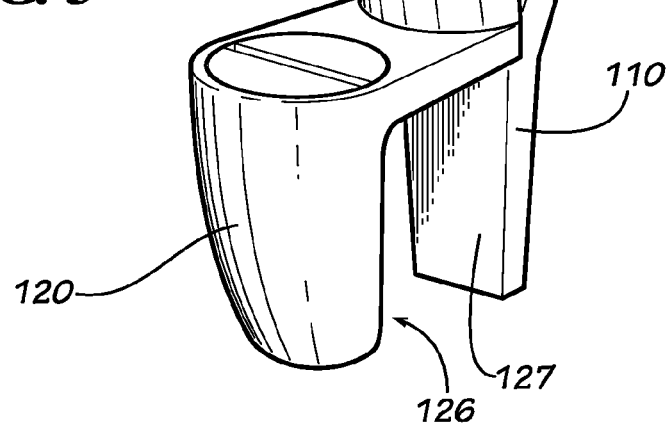
FIG. 3

TAPE MEASURE ANCHORING ACCESSORY

CROSS-REFERENCE TO RELATED APPLICATION

This application claims the priority benefit of U.S. Provisional Patent Application Ser. No. 61/266,408, filed Dec. 3, 2009, which is incorporated herein by reference.

TECHNICAL FIELD

The present invention relates generally to the field of tools and other construction implements and, in particular, to tape measures and/or other tools for measuring.

BACKGROUND

Tape measures, or measuring tapes, have been utilized by craftsman, woodworkers, and construction workers since at least as early as 1868 to make various measurements of materials. As is well known, a traditional tape measure generally includes an elongated metallic tape stored in a coiled form within a housing. The tape is typically formed of thin steel and includes an arcuate cross-section. Linear measurement graduations are usually imprinted into the concave side thereof. At an exposed terminal end of the tape, the tape measure traditionally includes a hook or flange in the form of a bent piece of metal that is generally orthogonal to the tape for engaging a work piece by a user taking measurements of the same.

When operating a tape measure, a user often utilizes the hook to engage an exterior edge or face of a particular work piece and then stretches the tape measure over the same. Once stretched over the work piece, a user can read the graduations on the face of the tape to determine a particular measurement. As such, tape measures are very easy to operate when the hook is able to engage an edge or face of a work piece. However, when making measurements, particularly those that do not include an edge or face on which to attach the end of a tape measure, it can be very difficult for a user to obtain an accurate measurement. Presently, when trying to obtain such measurements, a single user often latches the tape onto an available face/edge and then mathematically compensates for the unwanted portion of the total measurement. Errors are inevitably made when performing these types of calculations in the field. Thus, a user often requires the assistance of a second user to hold the tape in the desired location when making measurements and particularly those from an inside face of an underlying work piece. For example, when measuring from the interior face of a work piece (as opposed to the outside face of the same), an exposed surface for receiving the tape hook is generally not available. Therefore, in such situations, a user will often attempt to maintain the position of the tape hook against the interior face by pressing the hook against the same, which can be difficult or impossible if the distance being measured is more than few feet. Alternatively, the user may require the assistance of another person to hold the tape hook against the interior face of work piece.

Accordingly, it can be seen that needs exist for a measuring system that can be used to make those measurements in which an exterior face or edge of a work piece is not available. Additionally, it can be seen that needs exist for a measuring system that reduces or eliminates a user's reliance on another person when making particular measurements. It is to the provision of these needs and others that the present invention is primarily directed.

SUMMARY

In example embodiments, the present invention relates to a measuring tool that can be used in conjunction with a measuring tape to save user time and permit single-user measurements that traditionally require two or more persons. For example, the measuring tool of the present invention generally incorporates a puck-shaped body that can be coupled to various underlying work pieces and/or various other tools to serve as an anchor for a terminal end of a tape measure. As such, the present invention solves many of the problems associated with typical tape measures.

In one aspect, the present invention is a measuring tool having a substantially puck-shaped body having a top surface and a bottom surface. The tool also includes an elongated slot formed in the top surface and a fastener adjacent the bottom surface. The elongated slot is adapted to receive a portion of a tape measure. The fastener is used to secure the measuring tool to the underlying work piece, which can include various materials such as, but not limited to, dimensional lumber, composite wood, metal, glass, concrete, rubber, plastic, etc. The fastener can be a magnet, clip, nail, bolt, suction cup, etc.

In another aspect, the present invention is an anchor for use in conjunction with a measuring tape. The anchor includes a body having substantially planar top and bottom surfaces and an elongated recess formed in the top surface of the body. The anchor also includes a fastener coupled to the bottom surface of the body. The recess is adapted to receive a terminal end of a tape measure. The fastener is operable to engage an underlying work piece.

In still another aspect, the present invention is a measuring apparatus that includes a clamp having two working surfaces for engaging an underlying work piece and a measuring puck coupled to the clamp. The measuring puck includes a cylindrical body, an elongated slot, and a fastener. The elongated slot is formed in a top surface of the cylindrical body and the slot is adapted to receive a portion of a tape measure therein. The fastener is adjacent a bottom surface of the cylindrical body and is operable to couple the body to the clamp.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

FIG. 1 is a top perspective view of a measuring tool according to a first example embodiment of the present invention.

FIG. 2 is a bottom perspective view of the measuring tool of FIG. 1.

FIG. 3 is a perspective view of another measuring tool according to a second example embodiment of the present invention.

DETAILED DESCRIPTION OF EXAMPLE EMBODIMENTS

Figure 5:
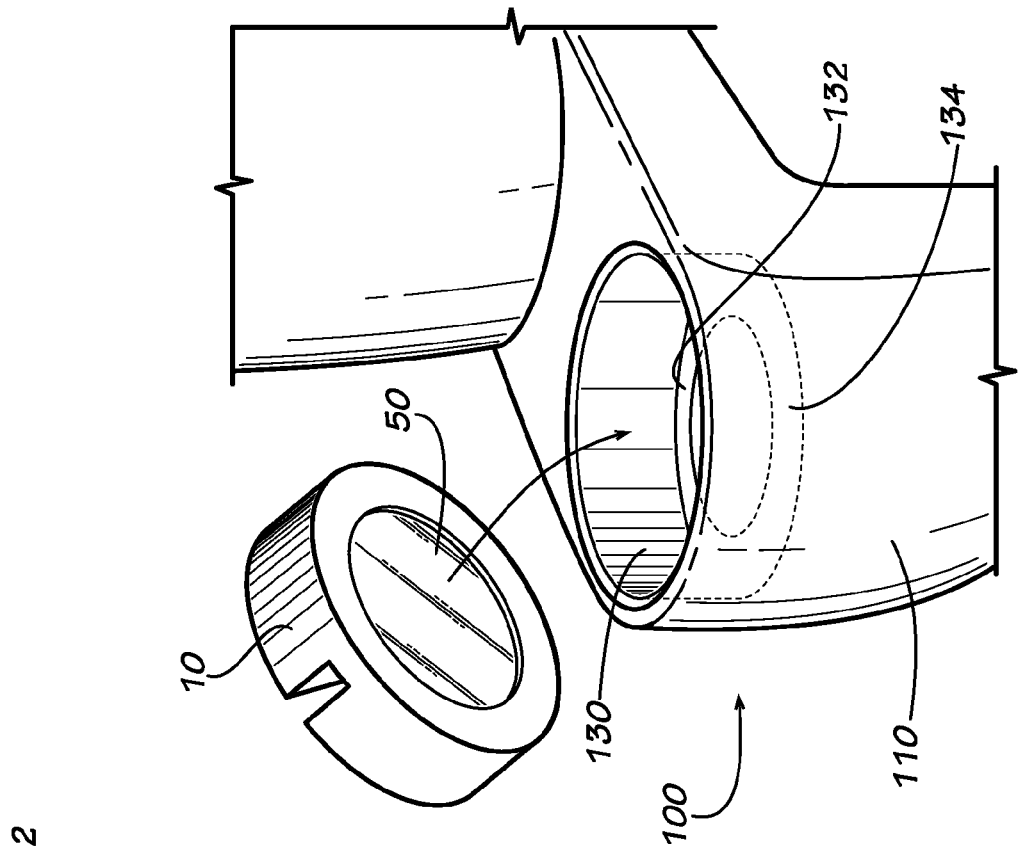
FIG. 5 is a close-up partially exploded perspective view of the measuring tool of FIG. 3, shown with measuring puck removed for clarity.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-9 depict multiple example embodiments of a measuring puck 10 and various measuring tools in accordance with the present invention. Generally, the measuring puck 10 of the present invention includes a puck body 20, a slot 30 for engaging a corresponding hook or flange 40 of a measuring tape 42, and preferably a fastener 50 coupled to the underside of the puck. As it will be discussed in greater detail below, the puck 10 of the present invention permits a single user to take measurements of work pieces that are initiated from an interior face of such work pieces, without the aid of another user. Additionally, the puck 10 permits a user to measure various lengths of a work piece by serving as an anchor for the tape hook 40. As such, it has been found that the present invention aids a user in taking difficult measurements of various work pieces and saves the user time in doing so.

With particular reference now to FIGS. 1-2, it can be seen that in example embodiments of the present invention the puck body 20 is substantially cylindrical in shape and includes a substantially circular cross-section. Alternatively, the puck body 20 can include a rectangular, elliptical, or triangular cross-section, or can otherwise be shaped as desired. In example embodiments, the puck body 20 is between about 0.25 inches (0.635 cm) and about 4.0 inches (10.16 cm) in diameter, and more preferably between about 0.5 inches (1.27 cm) and about 2.0 inches (5.08 cm) in diameter. The body 20 includes a top surface 22, a bottom surface 24, and an exterior circumferential surface 25, as seen in the drawing figures. The puck body 20 also includes a slot or channel 30 that extends along a chord of the body and forms a recess within the top surface 22. The slot 30 can extend along only a portion of the chord, or can extend from edge-to-edge of the puck body 20, as depicted in the drawing figures. In other example embodiments of the present invention, two or more slots 30 are formed within the puck body 20. The bottom surface 24 preferably includes a fastener 50 for securing the puck 10 to a working piece. In commercial embodiments, the fastener 50 is a magnet that is coupled to the bottom surface 24 of the puck body 20. Alternatively, the puck body 20 can include a plurality of magnets and/or the one or more magnets can be embedded, or partially embedded, within the bottom surface 24 of the puck 10. In still other embodiments, the fastener 50 can include one or more hooks, suction cups, clips, snaps, hook and loop fastener, epoxy, glue, adhesive or other conventional fasteners as appreciated by one of ordinary skill in the art.

As seen in FIGS. 1-2, the puck 10 of the present invention can be useful as an anchor to assist a user in taking measurements. For instance, in example embodiments the magnetic fastener 50 of the puck 10 can be positioned over a work piece, such as a steel beam and/or other ferromagnetic surfaces (e.g., such as a nail extending from a piece of lumber) and can be magnetically secured thereto. Optionally, the puck 10 can be secured to an underlying work piece with use of one or more alternative fasteners such as those described above (suction cups, clips, snaps, hook and loop material, etc.). Either way, a user can then insert the tape hook 40 of a measuring tape 42 into the slot 30 and can extend the measuring tape out over the underlying work piece to measure the same. As such, the user can locate the puck 10 as desired along the underlying work piece and can vary the location of the puck to accommodate multiple initiating points for taking various measurements. In alternative embodiments, the puck 10 can be permanently (or semi-permanently) installed on a particular surface with glue, epoxy, etc. or can be welded thereto. The puck body 20 can be formed from wood, rubber, metal, ceramics, glass, various polymers, and/or other substantially rigid materials.

Figure 4:
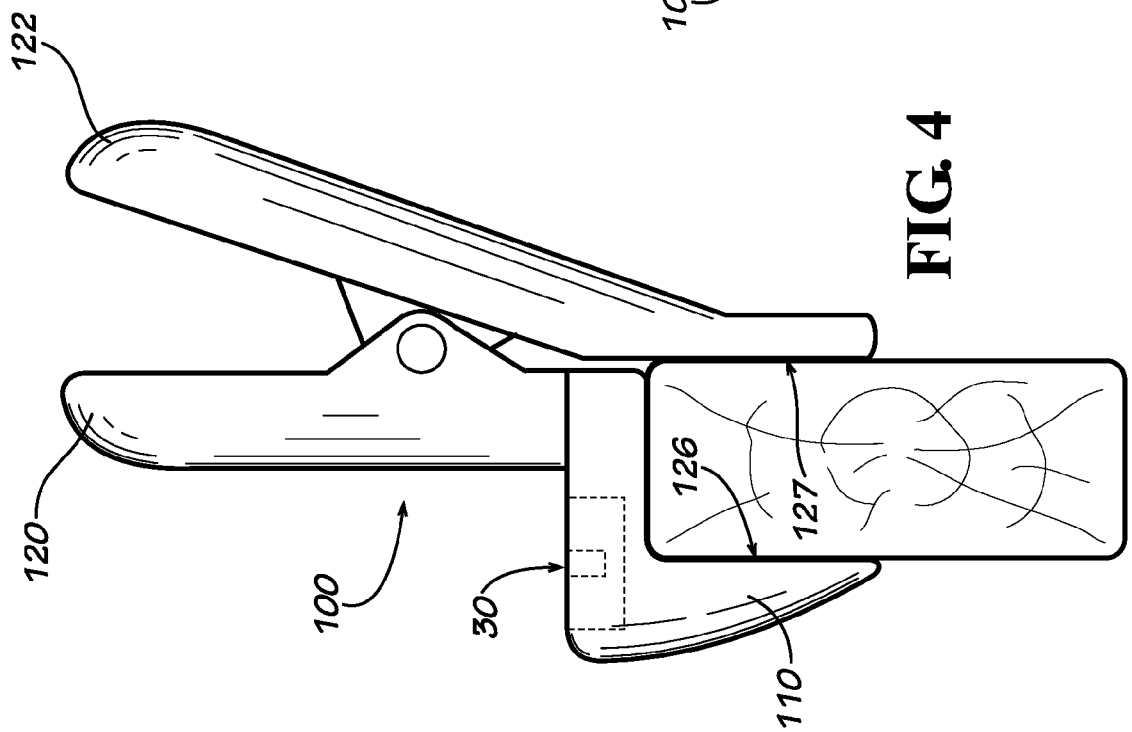
FIG. 4 is a side-elevation view of the measuring tool of FIG. 3, shown attached to an underlying work piece.

In another example embodiment, the present invention encompasses a measuring clip 100 as depicted in FIGS. 3-6. In this embodiment, the measuring puck 10, as substantially described above, is included as a component in conjunction with a conventional spring-biased clip body 110. For example, in commercial embodiments as shown in FIG. 5, the clip body 110 includes a pair of control arms 120, 122 that are coupled together with a spring (not shown). The control arms 120, 122 include opposed working surfaces 126, 127 for engaging a work piece, as best seen in FIG. 4. Additionally, the clip body 110 also includes a recess 130 that is adapted to receive a measuring puck 10 therein, although in alternative embodiments, the clip body 110 does not include any such recess and the puck 10 can be coupled to another suitable surface of the same. In preferred example embodiments, a bottom surface 132 of the recess 130 comprises a steel plate 134 or other ferromagnetic surface for removably mating with the magnetic fastener 50 of the puck 10, as depicted in FIG. 5. In alternative embodiments, the bottom surface 132 of the recess 130 can include loop material for selectively engaging corresponding hook material on the bottom surface 24 of the puck 10 (or vice versa). In still other embodiments, the puck 10 can be secured within the recess 130 with glue, epoxy, other fasteners, or can be formed as a permanent component thereof. However, it is preferable that the puck 10 is rotatable within the recess 130, such that a user can align the slot 30 of the puck 10 as desired, such that the slot rotation facilitates the position of a corresponding tape measure. In commercial embodiments, the midpoint of the slot 30 is substantially aligned within the plane of working surface 126 (as best seen in FIG. 4), although in other embodiments the slot can be aligned as otherwise desired by a user.

Figure 6:
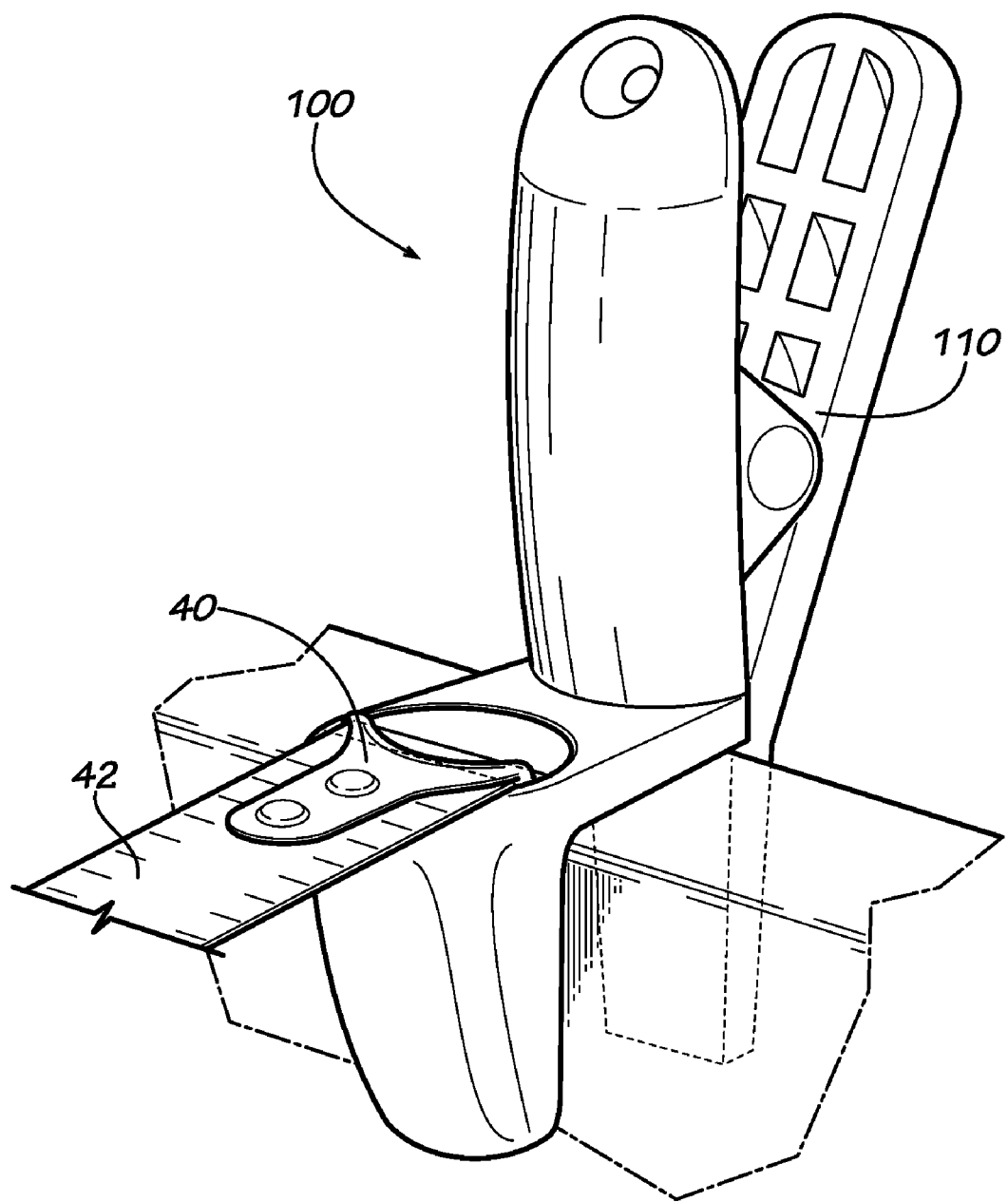
FIG. 6 is a partial perspective view of the measuring tool of FIG. 3, shown with a tape measure coupled to the measuring puck.

In operation, the measuring clip 100 can be clamped onto a work piece, such as, but not limited to, dimensional lumber (e.g., 2"×4" boards), as seen in FIGS. 4 and 6. Once the clip 100 has been secured to a work piece, a user can insert the tape hook 40 into the slot 30 of the puck 10 (FIG. 6) and extend the tape measure 42 away from the clip until the necessary tape length has been reached to make the desired measurement. Because the midpoint of the slot 30 is preferably aligned with the plane of working surface 126, the terminal end of the tape measure is substantially aligned with the corresponding face of the underlying working piece. Thus, when utilizing the clip 100 of the present invention, a single user can easily and accurately take a measurement that begins from the inside face of a work piece as shown in FIG. 6. Additionally, when the puck 10 is rotatably secured within the clip body 110, the user can rotate the puck to take non-rectilinear measurements, measurements at oblique angles from the clip 100, and/or various other measurements as desired.

Figure 7:
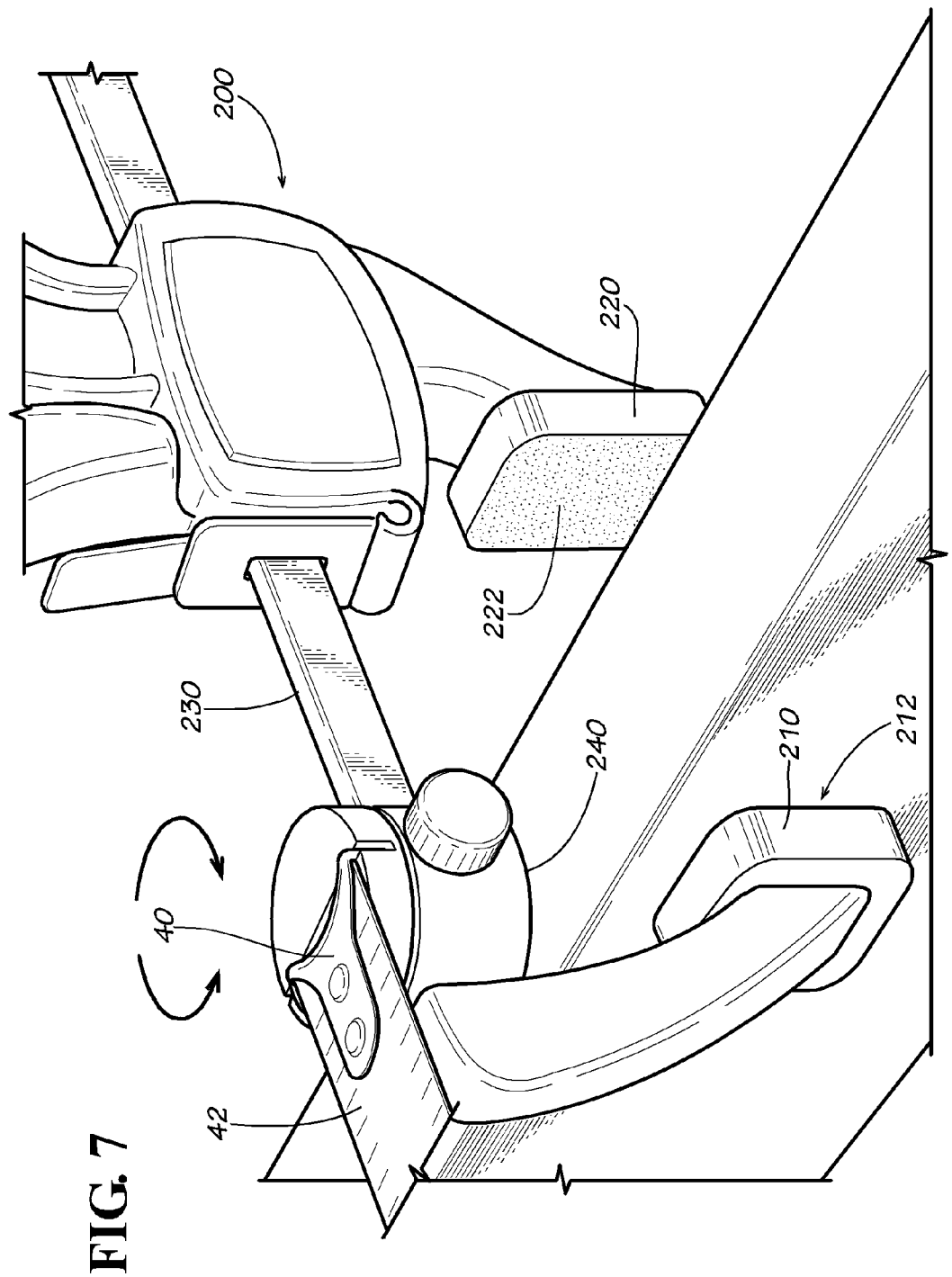
FIG. 7 is a perspective view of another measuring tool according to a third example embodiment of the present invention.
Figure 9:
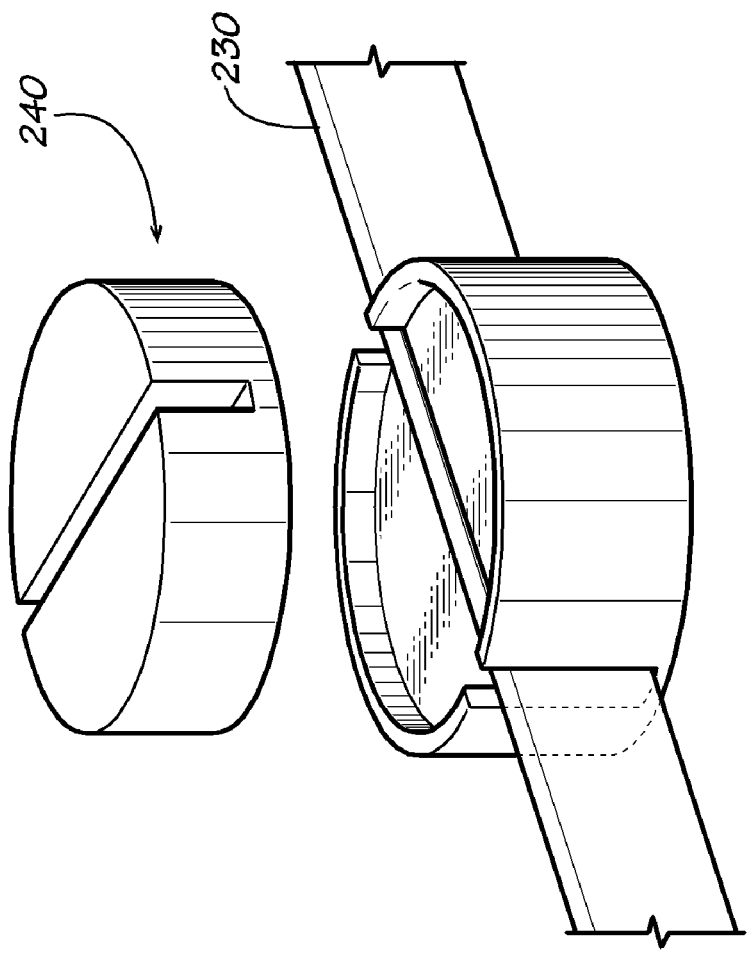
FIG. 9 is a close-up partially exploded perspective view of the measuring tool of FIG. 7, showing a measuring puck and corresponding bracket body.
Figure 8:
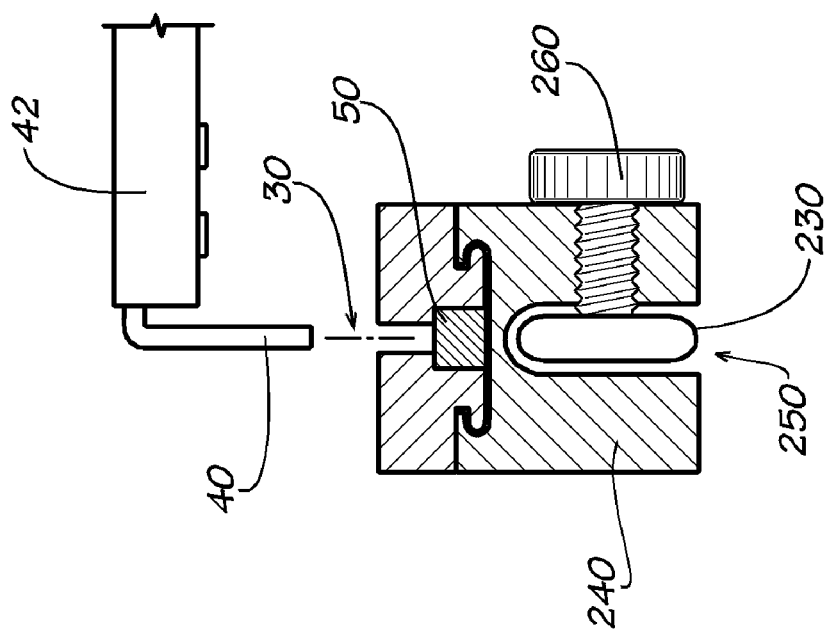
FIG. 8 is a partial cross-sectional view of the measuring tool of FIG. 7.

In another example embodiment, the present invention includes a bar clamp 200 that also incorporates a measuring puck 10 as seen in FIGS. 7-9. In example embodiments the bar clamp 200 can be a conventional screw-type adjustable bar clamp, a ratcheting-type bar clamp (FIG. 7), or other traditional bar clamp as appreciated by one of ordinary skill in the art. Generally, the bar clamp 200 includes a first stationary arm 210 having a first working surface 212, and a second movable arm 220 having a second working surface 222. The first arm 210 is fixedly coupled to a terminal end of an elongated bar/span 230, while the second arm 220 is slidably coupled to the same. In commercial embodiments of the present invention, the puck 10 is seated within a sliding bracket body 240 that is operable to engage and be removably coupled to the bar 230, as best seen in FIG. 8. The puck 10 can be coupled to the bracket body 240 with one or more fasteners 50 as described above. Similarly, the bracket body 240 can include one or more complementary fasteners (not shown) to engage and secure the puck 10 thereto. In depicted example embodiments, the bracket body 240 includes a channel 250 that is sized and shaped to substantially receive the bar 230 therein. The bracket body 240 also includes a set screw 260, or other conventional fastener, to releaseably secure the bracket body 240 to the bar 230.

In operation, the bar clamp 200 can be secured to an underlying work piece such that working surfaces 212 and 222 engage opposite sides of the same. Then, a user can slidably extend the bracket body 240 and corresponding puck 10 along the bar/span 230 until a desired anchoring location has been reached. To secure the bracket body 240 at the desired anchoring location, the set screw 260 can be tightened against the bar 230 until the bracket body is no longer able to exhibit lateral movement along the bar. Then, as with previous embodiments, a user can insert the tape hook 40 of a tape measure into the slot 30 of the puck 10 to secure the same thereto, and extend the tape measure over the work piece or area to be measured.

Figure 10:
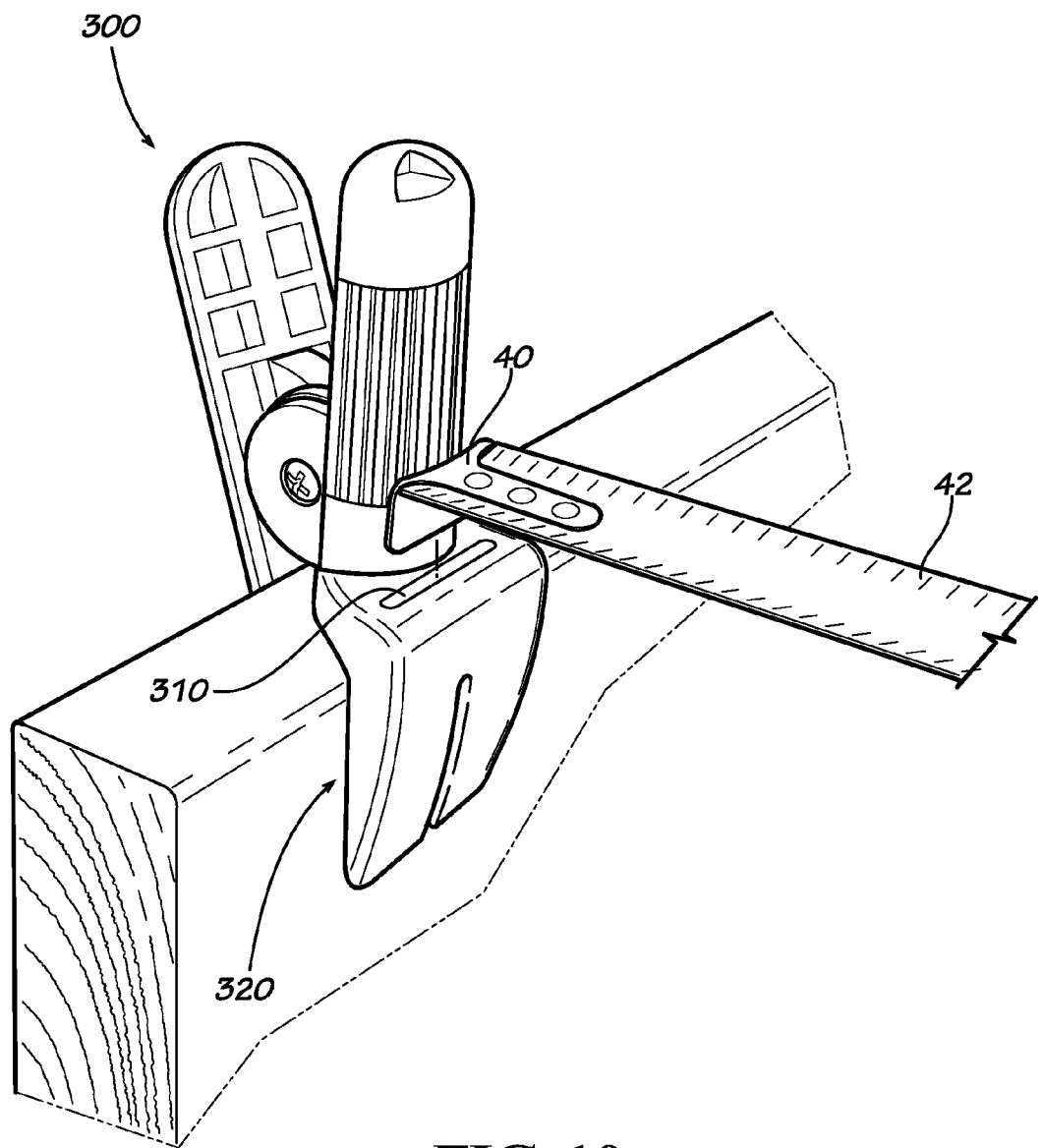
FIG. 10, is a perspective view of still another measuring tool according to a fourth example embodiment of the present invention.

In still another example embodiment, the present invention includes a clip and/or a clamp 300 as depicted in FIG. 10. In this embodiment, the clip 300 is similar to the previously discussed clip 100, except that the clip 300 does not include a puck 10. Instead, clip 300 includes a slot 310 that is substantially coplanar with interior working surface 320, as shown in the drawing figure. As such, a user can insert the tape hook 40 of a measuring tape 42 into the slot 310, and can utilize the same as an anchor in a similar manner as described above in reference to preceding embodiments.

Although the various example embodiments of the present invention are largely described above as tools for taking measurements, various other implements can be used in conjunction with the same. For example, a traditional chalk-line tool—generally a chalk-coated string having a hooked terminal end—can be utilized with the present invention by engaging the hooked end of the tool with slot 30 of the puck 10 (or slot 310 of clip 300) and serving as an anchor for the same.

While the invention has been described with reference to preferred and example embodiments, it will be understood by those skilled in the art that a variety of modifications, additions and deletions are within the scope of the invention, as defined by the following claims.

What is claimed is:

1. A measuring apparatus comprising:
   a clamp having two working surfaces for engaging an underlying work piece; and
   a measuring puck coupled to the clamp; the measuring puck including:
   a cylindrical body;
   an elongated slot formed in a top surface of the cylindrical body, the slot adapted to receive a portion of a tape measure therein; and
   a fastener adjacent a bottom surface of the cylindrical body operable to couple the body to the clamp.

2. The measuring apparatus of claim 1, wherein the measuring puck comprises a plurality of fasteners.

3. The measuring apparatus of claim 2, wherein the plurality of fasteners includes a plurality of magnets.

4. The measuring apparatus of claim 1, wherein the cylindrical body of the measuring puck has a diameter of between about 0.25 inches and about 4.0 inches.

5. The measuring apparatus of claim 4, wherein the cylindrical body of the measuring puck has a diameter of between about 0.5 inches and about 2.0 inches.

6. The measuring apparatus of claim 1, further comprising a tape measure releasably coupled to the measuring puck.

7. The measuring apparatus of claim 1, wherein the clamp includes a recess adapted to receive the measuring puck therein.

8. The measuring apparatus of claim 7, wherein the recess comprises a ferromagnetic surface.

9. The measuring apparatus of claim 8, wherein the fastener comprises a magnet operable to engage the ferromagnetic surface of the recess.

10. The measuring apparatus of claim 9, wherein the magnet is at least partially embedded within the bottom surface of the cylindrical body.

\* \* \* \* \*